United States Patent
Attak et al.

(10) Patent No.: US 10,491,513 B2
(45) Date of Patent: Nov. 26, 2019

(54) VERIFYING PACKET TAGS IN SOFTWARE DEFINED NETWORKS

(71) Applicant: HEWLETT PACKARD ENTERPRISE DEVELOPMENT LP, Houston, TX (US)

(72) Inventors: Hamza Attak, Bristol (GB); Ludovic Emmanuel Paul Noel Jacquin, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 324 days.

(21) Appl. No.: 15/410,975

(22) Filed: Jan. 20, 2017

(65) Prior Publication Data
US 2018/0212824 A1   Jul. 26, 2018

(51) Int. Cl.
*H04L 12/725*   (2013.01)
*H04L 12/24*    (2006.01)
(Continued)

(52) U.S. Cl.
CPC .......... *H04L 45/30* (2013.01); *H04L 41/0853* (2013.01); *H04L 41/12* (2013.01);
(Continued)

(58) Field of Classification Search
CPC ..... H04L 12/24; H04L 12/26; H04L 41/0853; H04L 41/0866; H04L 41/0873;
(Continued)

(56) References Cited

U.S. PATENT DOCUMENTS

| 2015/0138993 A1 | 5/2015 | Forster et al. |
| 2015/0249587 A1 | 9/2015 | Kozat et al. |

(Continued)

FOREIGN PATENT DOCUMENTS

| WO | WO-2015187337 A1 | 12/2015 |
| WO | WO-2016085516 A1 | 6/2016 |

OTHER PUBLICATIONS

Kai Bu et al., "Is Every Flow on The Right Track?: Inspect SDN Forwarding with RuleScope," Dec. 25, 2015, pp. 1-9, Available at: <xitaowen.com/papers/rulescope_infocom16.pdf>.
(Continued)

*Primary Examiner* — Khoa Huynh
(74) *Attorney, Agent, or Firm* — Hewlett Packard Enterprise Patent Department

(57) ABSTRACT

Examples relate to packet tagging in Software Defined Networks (SDN). In an example, at least one SDN switch of an SDN marks a packet passing through the SDN switch with a packet tag, wherein the packet tag comprises an identifier of the SDN switch and a digest of a set of network forwarding rules of the SDN switch. Some examples generate, by a verifier, a verifier tag comprising the identifier of the at least one SDN switch and the digest of the set of network forwarding rules of the at least one SDN switch obtained from a network rules table and a network topology table stored in the verifier. Some examples receive, at a particular network element and from a verifier of the SDN, a request for attestation of the packet. Some examples check, by a verification engine, the packet tag against the verifier tag.

20 Claims, 4 Drawing Sheets

(51) Int. Cl.
*H04L 12/26* (2006.01)
*H04L 12/715* (2013.01)
*H04L 12/751* (2013.01)

(52) U.S. Cl.
CPC .......... *H04L 43/0847* (2013.01); *H04L 43/10* (2013.01); *H04L 45/02* (2013.01); *H04L 45/64* (2013.01)

(58) Field of Classification Search
CPC ..... H04L 41/12; H04L 43/0847; H04L 43/10; H04L 45/30; H04L 45/02; H04L 45/64; H04L 45/745; H04L 63/0428; H04L 63/08
See application file for complete search history.

(56) References Cited

U.S. PATENT DOCUMENTS

| | | | | |
|---|---|---|---|---|
| 2015/0381492 A1* | 12/2015 | Kamble | ................ | H04L 45/745 370/392 |
| 2016/0164853 A1* | 6/2016 | Bifulco | .................. | H04L 63/08 726/7 |
| 2017/0331794 A1* | 11/2017 | Lokman | .............. | H04L 63/0428 |

OTHER PUBLICATIONS

Mian Dai et al., "Detecting Network Topology and Packet Trajectory with SDN-enabled FPGA Platform," Jun. 2016, pp. 1-7, ACM.
Peng Zhang et al., "Stick to the Script: Monitoring The Policy Compliance of SDN Data Plane," Mar. 2016, pp. 1-6, ACM.

* cited by examiner

VERIFYING PACKET TAGS IN SOFTWARE DEFINED NETWORKS

BACKGROUND

Software defined networking is a dynamic, manageable, and adaptable network architecture that allows for flexibility in the network configurations used to manage network communications between network elements forming a software defined network (SDN). SDN controllers manage the network elements in the SDN being capable of collecting and keeping configuration information of the SDN by periodically interacting with the network elements.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
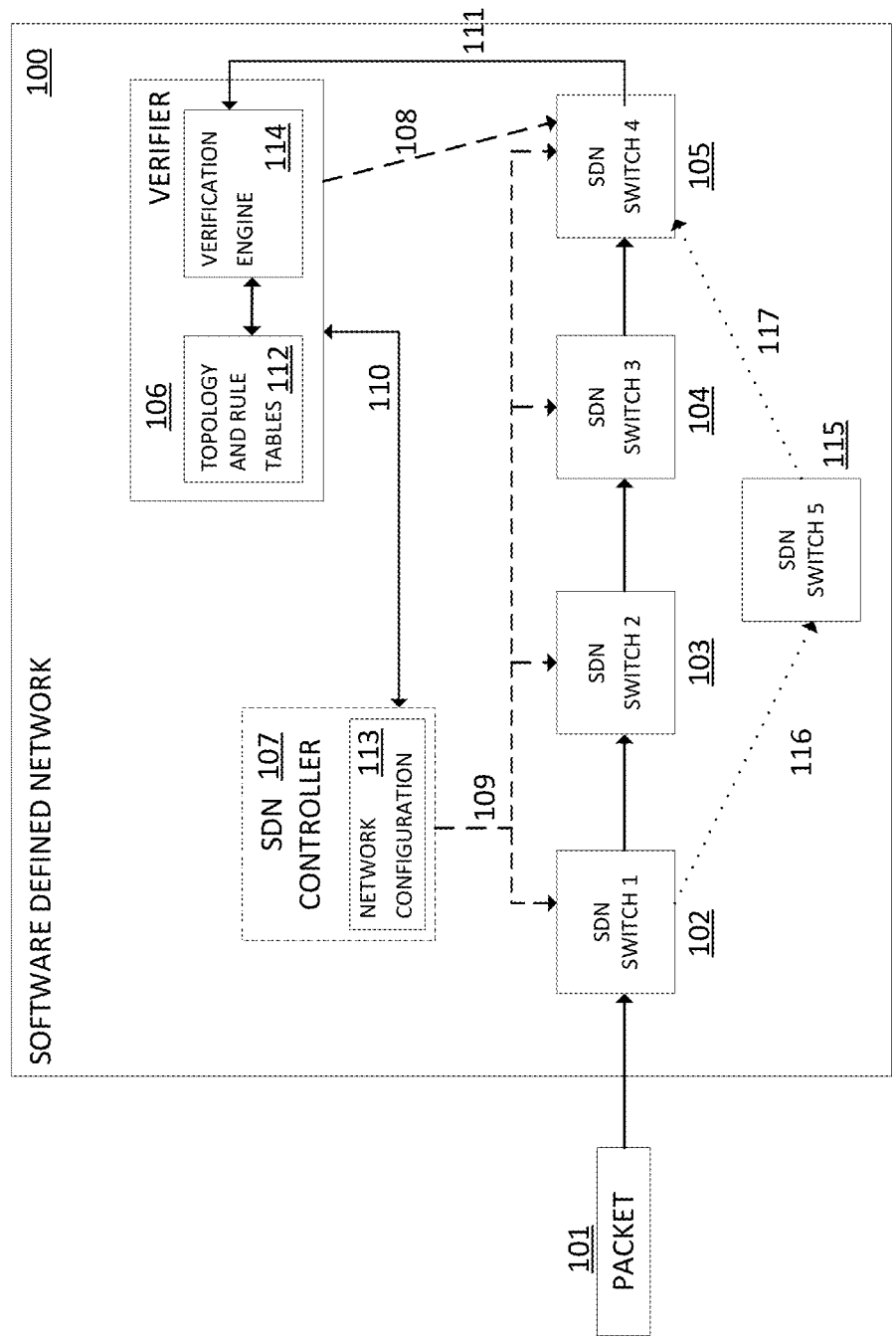
FIG. 1 is a schematic block diagram of an example SDN including a SDN controller, a verifier and a plurality of SDN switches, wherein packets pass through the plurality of SDN switches.

In a software defined network (SDN), a data packet may pass through different network elements, e.g., routers, switches, servers, etc., which forward the data packet depending on a set of network forwarding rules previously defined and stored in the network elements. These network forwarding rules may be configured and updated by a SDN controller. The SDN may comprise one or more SDN controllers. The SDN controllers are centralized entities configured to determine the network traffic flow through the SDN and provide an abstract view of the SDN to other network components, such as SDN applications. While an administrator may configure SDN controllers, the configuration of the network elements is generally performed by the SDN controller.

SDN controllers store network forwarding rules that determine network traffic flow through the various network elements and network topology of the SDN. The SDN controller may periodically update the network forwarding rules stored in the network elements of the SDN. SDN controllers may change network forwarding rules stored in the network elements, for example, as part of a load balancing routine, responsive to one or more network elements crashing, or responsive to clients requesting specific configurations of the network elements used.

However, packets traversing an SDN may be susceptible of being corrupted (either unintentionally or intentionally and maliciously). For example, in SDNs a packet may arrive to the destination node but passing through network elements other than those defined in the network forwarding rules of the network elements. The network elements originally defined in the network forwarding rules may be considered as "safe" network elements and any other network element may be considered as "malicious". Thus, the packet may be susceptible of being corrupted by these "malicious" network elements. Moreover, in some cases, the set of network forwarding rules stored by the corresponding SDN elements may be tampered with, which also can cause packet corruption. The SDN controller generally does not attest to the node's state or the packet's path. Usually, when an incoherency happens between a SDN controller and any of the managed SDN elements, the network rules table applying to the managed SDN element is simply flushed and no detection is performed.

To address these issues, examples described herein may perform a verification of packet tags that assure that packets have been correctly processed by SDN elements, including switches, servers, routers, etc., in the computing network when comparing with a known network topology and a known rule configuration managed by an SDN controller. The computing network may at least partially implement an SDN. In some examples, at least one SDN element, for example a switch, may mark a packet passing through the SDN element with a packet tag. The packet tag may comprise an identifier of the SDN element, such as a switch identifier, and a digest of a set of network forwarding rules of the network element. In such examples, a particular subset of the SDN elements of the SDN may mark the packets passing though the SDN elements. In some other examples, all the SDN elements of the SDN may mark the packets passing through the SDN elements.

The verifier may create a verifier tag wherein the verifier tag comprises an identifier of the network element and a digest of the set of network forwarding rules of the network element that are obtained from a network rules table and a network topology table stored in the verifier. The network rules table and a network topology table may be generated by the verifier based on a SDN network configuration received from the SDN controller of the SDN. The verifier may be internal, for example a SDN verifier, or external to the SDN, for example a verifier forming part of the part of the computing network other than the SDN like in hybrid networks partially implementing SDNs.

Then, a network element of the computing network may receive, from a verifier, a request for attestation of a particular packet passing though the network element. The network element receiving the attestation may be any network element in the computing network, including SDN elements, through which the particular packet passes. The network elements are capable of attesting to a particular packet to the verifier. In some examples, the network element receiving the request for attestation from the verifier may be a network element of the SDN, such as an SDN switch, connected to the verifier. In other examples, the network element may be any other network element in a computing network other than the SDN elements. By way of example, in hybrid networks implementing at least partially SDNs and legacy networking, any network element of the hybrid network being connected to the verifier may receive the request for attestation. As used herein, "network elements" may be manageable logical entities uniting one or more physical devices that form the network, such as switches, nodes, servers, etc.

The SDN controller may periodically update the verifier with the topology of the SDN and the respective network forwarding rules of the SDN elements. In this way, the verifier knows which SDN elements are in charge of forwarding which packets and which rules are used in the packet tag for each SDN element.

In some examples, the verifier may allocate a verification engine to check the packet tags, received form the network elements, against the generated verifier tags. In some examples, the verification engine may be allocated in the network element to which the request for attestation is sent. In such examples, the verifier may also send the generated verifier tags to the network element and the verification engine performs the verification in the network element itself. In some other examples, the verification engine may be an element external to the SDN and the verifier, such that the network element receiving the request for attestation and the verifier send the respective packet and verification tags to the verification engine to perform verification.

Referring now to the drawings, FIG. 1 shows a schematic block diagram of an example SDN 100 including a SDN controller 107, a verifier 106 and a plurality of SDN switches 102-105, wherein packets 101 pass through the plurality of SDN switches 102-105. It should be understood that the SDN 100 depicted in FIG. 1 may include additional components and that some of the components described herein may be removed and/or modified without departing from a scope of the SDN 100.

In such example, the SDN controller 107, that may be externally managed by an administrator (not shown in the figure), stores a network configuration 113. The network configuration 113 may be stored in an internal memory of the SDN controller 107 and comprises a network topology and a current rule mapping of each of the SDN switches 102-105, the current rule mapping describing the network forwarding rules for each one of the SDN switches 102-105. In some examples, the network configuration 113 also stores the current state of the SDN switches 102-105. The topology of the SDN determines the structure of the network including the various elements forming the network, for example switches, nodes, servers, and the links connecting these elements. The SDN controller 107 may expose an Application Programming Interface (API) for outside applications to retrieve the network forwarding rules of the SDN switches 102-105. The topology of the SDN may be provided by a network administrator, instead of being provided by the SDN controller 107.

The SDN controller 107 is configured to periodically send to the corresponding SDN switches 102-105 an updated version 109 of the respective network forwarding rules and to periodically send an updated version 110 of the network configuration 113 to the verifier 106. In response to receiving the network configuration 113, the verifier 106 generates a network rules table and a network topology table 112 based on the received network configuration 113 (which comprises a network topology, as described above). The network topology table stores paths among the SDN switches 102-105 and the network rules table stores the network forwarding rules applied by the SDN switches 102-105. When the network rules table and a network topology table 112 already exists in the verifier 106, the verifier 106 updates the existing tables 112 with the received network configuration 113.

In the example of FIG. 1, the packet 101 passing through the SDN switches 102-105 is marked with a packet tag in each one of the SDN switches 102-105. Thus, SDN switch 102 creates a first packet tag "t1" comprising an identifier of the SDN switch 102 and a digest of a set of the network forwarding rules stored in the SDN switch 102, the SDN switch 103 adds a second packet tag "t2" comprising an identifier of the SDN switch 103 and a digest of a set of the network forwarding rules stored in the SDN switch 103, the SDN switch 104 adds a third packet tag "t3" comprising an identifier of the SDN switch 104 and a digest of a set of the network forwarding rules stored in the SDN switch 104 and the SDN switch 105 adds a fourth packet tag "t4" comprising an identifier of the SDN switch 105 and a digest of a set of the network forwarding rules stored in the SDN switch 105. In this example, each SDN switch 102-105 mark the packet 101 with the switch's locally generated packet tag {t1, . . . , t4}. In other examples including more switches, the packet 101 would be subsequently marked with a new packet tag following the same method when the packet 101 pass through another SDN switch on its path.

In some examples, the digest of the network forwarding rules stored in the SDN switches 102-105 may be the digest of any combination of the network forwarding rules stored in the SDN switches 102-105, including a digest of a set of network forwarding rules applying to a particular packet in a particular SDN switch or a digest of the entire set of network forwarding rules defined in the particular SDN switch.

In some other examples the packet tag may also comprise a packet's ingress port, a packet's egress port on the SDN switch 102-105, or a combination of both, in order to improve security during verification.

When the packet 101 reaches the end of the managed SDN 100, for example when the packet reaches SDN switch 105 in the example of FIG. 1, the packet is marked, by the SDN switch 105, with a cumulative packet tag that represents a cumulative digest (Secure Hash Algorithm-1 (SHA-1), for example) of the network forwarding rules the packet has been subject to in the SDN switches 102-105 the packet 101 has passed through. In some other examples, the verifier 106 may set up verification trigger points at any node on the SDN topology to trigger the verification process. In such cases and if the packet has passed through more than one SDN switch, the SDN switch set up as the verification trigger point is in charge of generating the cumulative packet tag. This cumulative packet tag is checked by the verification engine 114 of the verifier 106 against a verifier tag previously generated by the verifier 106. The verifier tag comprises identifiers of the SDN switches 102-105 through which the packet has passed and digests of the sets of network forwarding rules of the respective SDN switches 102-105. The identifiers and the sets of network forwarding rules of the verifier tag are obtained from the network rules table and the network topology table 112 stored in the verifier 106.

In some examples, the verification engine 114 may be located in the SDN switch 105. In such examples, the verifier 106 sends the verifier tags to the verification engine 114 of the SDN switch 105 to perform the verification of the packet tag. In some other examples, the verification engine 114 may be an element external to the SDN and the verifier. In such examples, the SDN switch 105 and the verifier 106 send the respective packet tags and verification tags to the verification engine 114 to perform the verification of the packet tag.

In the example of FIG. 1, the verifier 106 sends a request for attestation 108 of the packet 101 passing through the SDN switch 105. In response to said request, the SDN switch 105 marks the packet with a packet tag that represents the identifiers and the cumulative digest of the network forwarding rules corresponding to the previous SDN switches 102-104 and of SDN switch 105 too. Then, the SDN switch 105 sends the packet tag 111 to the verification engine 114.

After that, the verification engine 114 checks the packet tag against the verifier tag by verifying that the identifiers of the SDN switches and the network forwarding rules of the packet tag and the verifier tag are the same. According to the example of FIG. 1, the packet tag corresponding to the path {SDN switch 102→SDN switch 103→SDN switch 104→SDN switch 105} is a valid tag, and thus a valid path, based on the network topology table and network rules table 112 of the verifier 106. However, if, for example, SDN switch 102 erroneously forwards 116 packet 101 to SDN switch 115 that in turn forwards 117 the packet to SDN switch 105, the verifier 106 receives a packet tag corresponding to the path {SDN switch 102→SDN switch 115→SDN switch 105} that is an invalid tag, and thus an invalid path, when checked against the verifier tag based on network topology table and network rules table 112 of the verifier 106.

In some examples, the verifier 106 may send 110 to the SDN controller 107 the result of the verification process, so in case of corruption of a packet the administrator may be informed.

In some examples, the tag may be also signed by a security hardware component, such as a Trusted Platform Module (TPM) in order to protect again software attacks. This allows to attest the traversed switch's identity and verify the authenticity of the generated tag. The security hardware component is generally located in the SDN switches 102-105.

In some other examples, the SDN 100 may be a hybrid network at least partially implemented by SDNs.

Verification engine 114 and SDN controller 107 may be any combination of hardware and programming to implement the functionalities of the engine described herein. In examples described herein, such combinations of hardware and programming may be implemented in a number of different ways. For example, the programming for engines may be processor executable instructions stored on at least one non-transitory machine-readable storage medium and the hardware for engines may include at least one processor to execute those instructions. In some examples, the at least one machine-readable storage medium may store instructions that, when executed by the at least one processing resource, at least partially implement the engine(s). In examples described herein, multiple engines may be collectively implemented by a combination of hardware and programming, as described above. In other examples, the functionalities of verification engine 114 may be at least partially implemented in the form of electronic circuitry.

Figure 2:
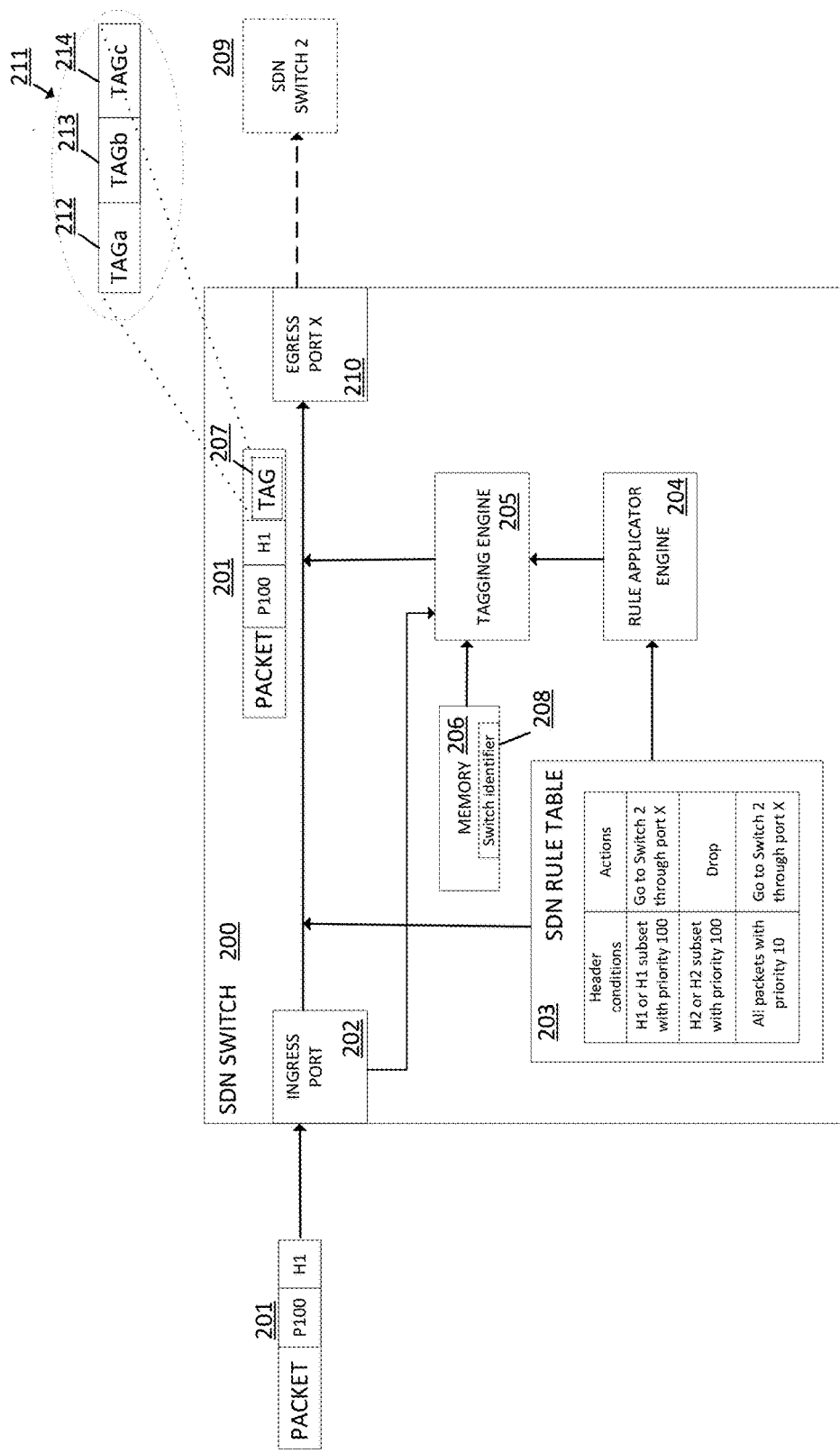
FIG. 2 is a schematic block diagram of an example SDN switch including a SDN rule table, a rule applicator engine and a tagging engine.

FIG. 2 shows a schematic block diagram of an example SDN switch 200 including a SDN rule table 203, a rule applicator engine 204 and a tagging engine 205. It should be understood that the SDN switch 200 depicted in FIG. 2 may include additional components and that some of the components described herein may be removed and/or modified without departing from a scope of the SDN switch 200.

The SDN switch 200 receives a packet 201 through ingress port 202. The rule applicator engine 204 of the SDN switch 200 reads the headers and the priority from the packet 201 and checks the SDN rule table 203 to determine how to manage the received packet.

The SDN rule table 203 includes the network forwarding rules applying to the packets received in the SDN switch 200. Each network forwarding rule specifies an action to be taken by the SDN switch 200 in response to receiving a packet. In the example of FIG. 2, the SDN rule table 203 determines that packets with header "H1" or "H1 subset" and with priority "100" are to be forwarded to "SDN switch 2" through egress port X, packets with header "H2" or "H2 subset" and with priority "100" are to be dropped and all packets with priority "10" are also to be forwarded to "SDN switch 2" through egress port X.

Since the received packet 201 has a header "H1" and a priority "100", the packet 201 is to be forwarded to "SDN switch 2" 209 through egress port X 210. The rule applicator engine 204 informs the tagging engine 205 of the network forwarding rule applying to the packet 201 and the tagging engine 205 creates the packet tag 207. The packet tag 207 comprises the identifier 208 of the SDN switch 200 previously stored in an internal memory 206 of the SDN switch 200, the ingress port 202 of the packet 201 and a digest of the network forwarding rule that apply to the packet 201.

In some examples, the switch identifier 208 may be signed by a security hardware component, such as a TPM, located in the SDN switch 200 (not shown in the figure) adding more trustworthiness in the tag 207.

In examples where the packet 201 has passed through a plurality of SDN switches that mark the packet, the tag 207 may be a cumulative tag 211 as shown in the expanded portion (dotted lines) of the packet of FIG. 2. Such cumulative packet 211 has previously passed through 2 SDN switches that have marked the packet 211 with respective tags "TAGa" 212, comprising an identifier of the respective SDN switch and a digest of a set of the network forwarding rules of the SDN switch applying to the packet 211, and "TAGb" 213, comprising an identifier of the respective SDN switch and a digest of a set of the network forwarding rules of the SDN switch applying to said packet 211. The tag added by the SDN switch 200 is "TAGc" 214 in the expanded view of packet 211 shown in FIG. 2. In the example of FIG. 2, SDN switch 209 may add a new "TAGd" to the cumulative packet 211 comprising an identifier of the SDN switch 209 and a digest of a set of the network forwarding rules of the SDN switch 209 applying to the packet 211. Although for illustrative purpose cumulative tag 211 is depicted as a chain of tags 212, 213, 214, corresponding to the packet tags added in the SDN switches the packet 201 has passed through, the cumulative tag 211 may store a hash of the traversed SDN switches' packet tags.

Rule applicator engine 204 and tagging engine 205 may be any combination of hardware and programming to implement the functionalities of the engines described herein. In examples described herein, such combinations of hardware and programming may be implemented in a number of different ways. For example, the programming for engines may be processor executable instructions stored on at least one non-transitory machine-readable storage medium and the hardware for engines may include at least one processor to execute those instructions. In some examples, the at least one machine-readable storage medium may store instructions that, when executed by the at least one processing resource, at least partially implement the engine(s). In examples described herein, multiple engines may be collectively implemented by a combination of hardware and programming, as described above. In other examples, the functionalities of rule applicator engine 204 or tagging engine 205 may be at least partially implemented in the form of electronic circuitry. The SDN rule table 203 may be stored in the memory 206 or in any other memory internal to the SDN switch 200 and accessible by the SDN controller. This memory may be, for example a hard drive, solid state drive, or the like.

Figure 3:
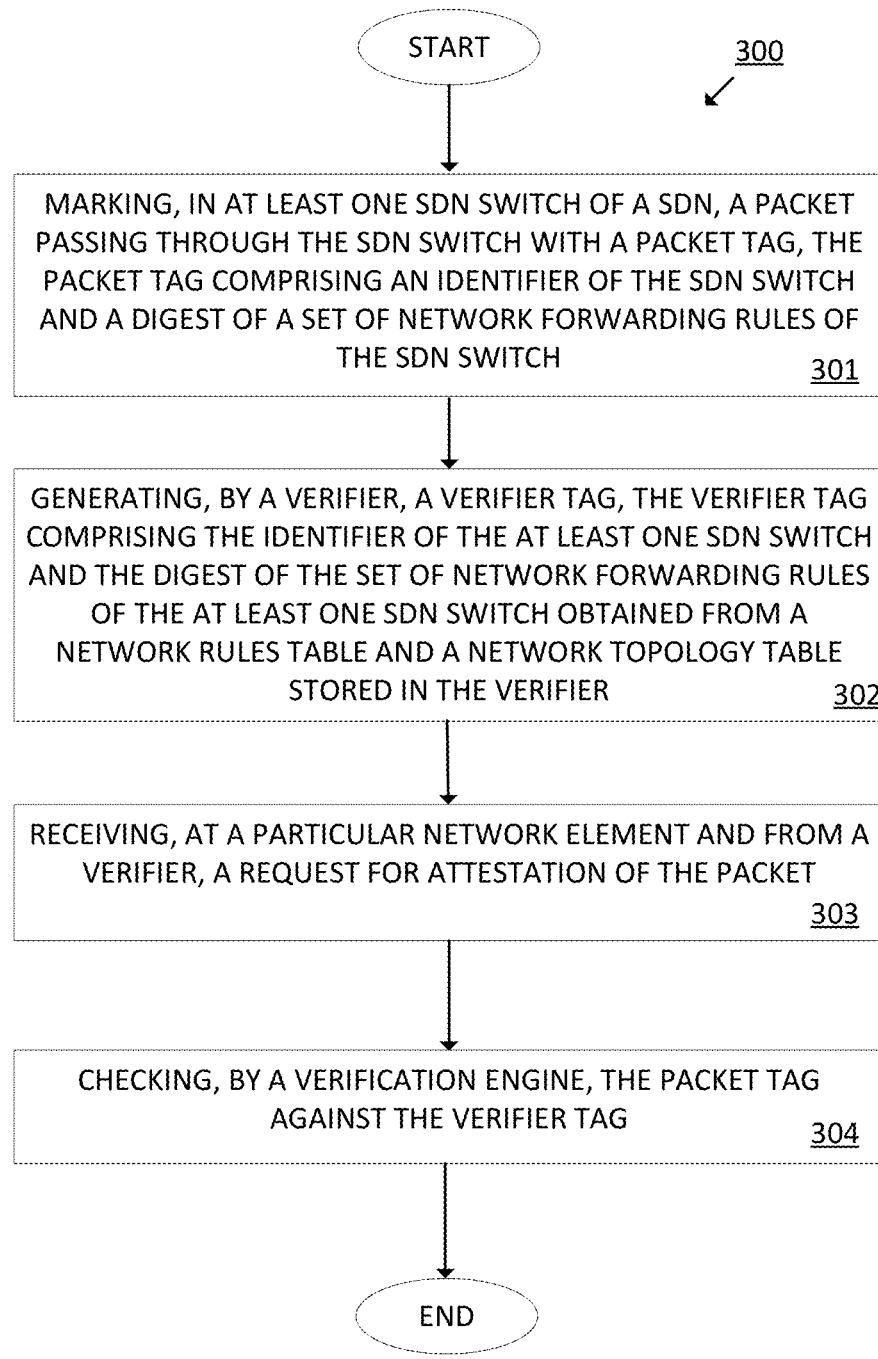
FIG. 3 is a flowchart of an example method of verifying packet tags in SDNs, including marking the packets passing through SDN switches with packet tags and checking the packet tags against verifier tags based on a network rules table and a network topology table of a verifier.

FIG. 3 shows a flowchart of an example method 300 of verifying packet tags in SDNs, including marking the packets passing through SDN switches with packet tags and checking the packet tags against a verifier tag based on a network rules table and a network topology table in the verifier. Although execution of method 300 is described below with reference to the SDN 100 of FIG. 1, other suitable SDNs, networks or systems for the execution of method 300 may be utilized. Additionally, implementation of method 300 is not limited to such examples.

At 301 of method 300, at least one of the SDN switches 102-105 of the SDN 100, marks a packet 101 passing through the SDN switch 102-105 with a packet tag, wherein the packet tag comprises an identifier of the SDN switch 102-105 and a digest of a set of network forwarding rules of the SDN switch 102-105. In some examples the tag may also comprise a packet's ingress, a packets egress port on the SDN switch 102-105 or a combination of both, to improve security when verification is performed.

In some examples, the digest may be of any combination of the network forwarding rules stored in the SDN switches 102-105. In such examples, the SDN controller 107 is to determine the network forwarding rules to be selected by the SDN switches 102-105 to create the digest. The SDN controller 107 is also to inform the verifier 106 of the network forwarding rules to be selected by the SDN switches 102-105 to create the digest, so the verifier knows what is in the packet tag.

The verifier 106, holds a view of all the network forwarding rules on all the SDN switches 102-105 and their configuration that has been received from the SDN controller (identification value, input/output ports on the SDN switches). To achieve this, the verifier 106 establishes a network topology table, including paths, and a network rules table 112, including the network forwarding rules, for each SDN switch 102-105 based on the network configuration 113 received form the SDN controller 107.

At 302 of method 300, the verifier 106 generates a verifier tag. The verifier tag comprises identifiers of the SDN switches 102-105 through which the packet has passed and digests of the sets of network forwarding rules of the respective SDN switches 102-105. The identifiers and the sets of network forwarding rules used for generating the verifier tag are obtained from the network rules table and the network topology table 112 stored in the verifier 106.

At 303 of method 300, a network element of the computing network, for example SDN switch 105, receives from the verifier 106 a request for attestation of a particular packet 101. Upon reception of the request, the SDN switch 105 mark the packet with a tag that represents a cumulative digest of network forwarding rules corresponding to SDN switches 102-105 and sends 111 the cumulative digest and the identifiers of the SDN switches 102-105 to the verifier 106. Then, the SDN switch 105 sends the packet tag to the verification engine 114 of the verifier 106.

At 304 of method 300, in response to reception of the tags in the verification engine 114, the verification engine 114 checks the received packet tag against the verifier tag. In some examples, the verification engine 114 may generate the verifier tag based on its knowledge of the network topology and network forwarding rules tables 112 and verify that the packet tag and the verifier tag are the same.

When doing the verification, the verifier 106 can detect any potential incoherency between what has really happened in the network (the packet tag) and what the SDN controller 107 knows of the SDN (verifier tag). Therefore, the verifier 106 is able to verify at a given network element that a packet has been correctly routed by the prior SDN switches.

The verification process herein described permits to verify the full path of the packet, the rules applied to the packet and also avoids from having to do the verification at each switch. It makes the verification faster and more flexible instead of systematic.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1 and 2.

Figure 4:
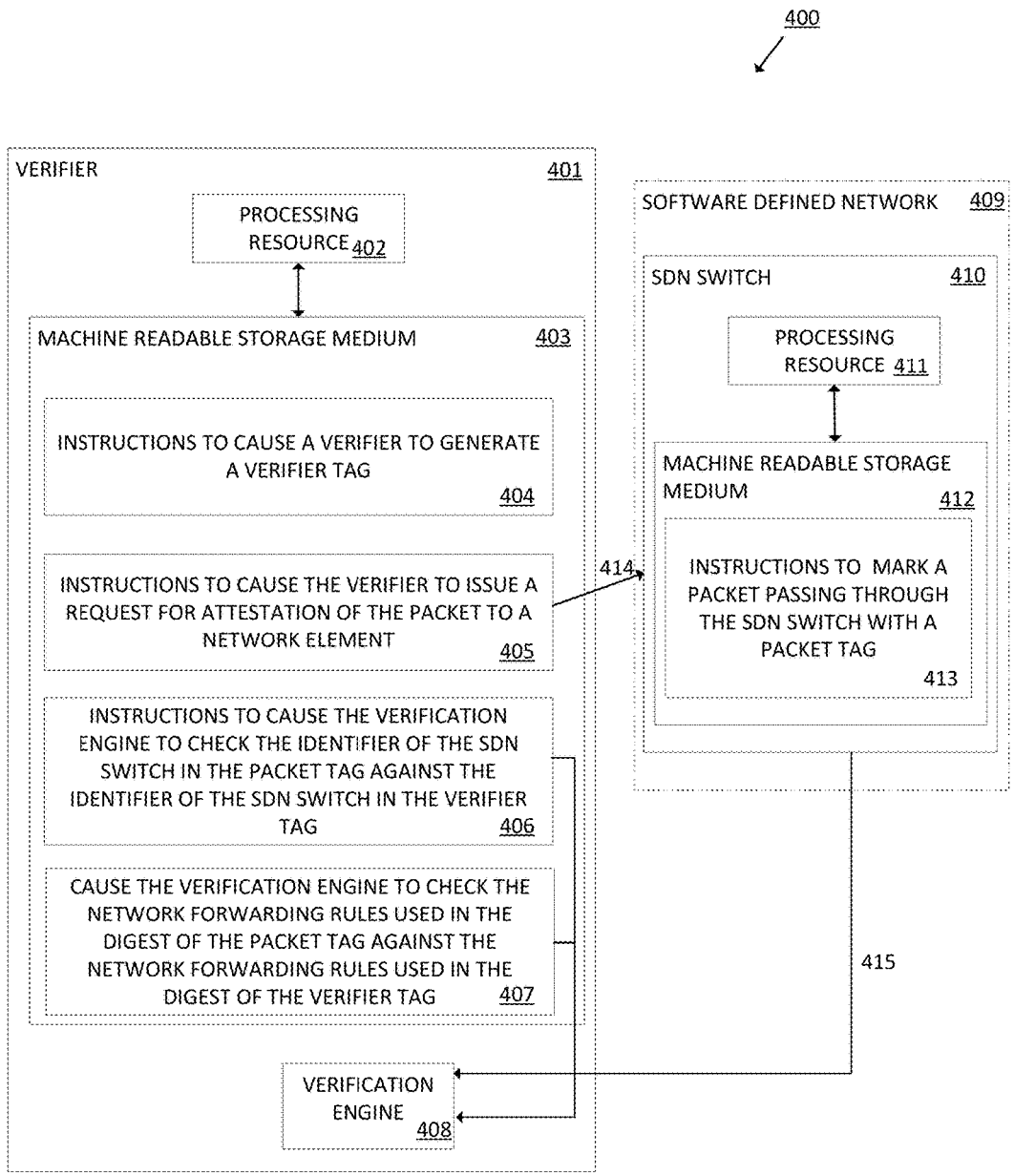
FIG. 4 is a schematic block diagram of an example system for verifying packet tags in SDNs, including marking packets passing through SDN switches with packet tags and checking the packet tags against verifier tags based on a network rules table and a network topology table of a verifier.

FIG. 4 shows a schematic block diagram of an example system 400 for verifying packet tags in SDNs 409, including marking packets passing through SDN switches 410 with a packet tag and checking the packet tags against a verifier tag. It should be understood that the system 400 depicted in FIG. 4 may include additional components and that some of the components described herein may be removed and/or modified without departing from a scope of the SDN switch 200.

The system 400 is depicted as including an SDN 409 and a verifier 401 external to the SDN 409. In other examples the verifier may be a SDN verifier forming part of the SDN 409. The verifier 401 is depicted as including a processing resource 402, a machine-readable storage medium 403 and a verification engine 408. In other examples, the verification engine 408 may be an element forming part of the SDN 409 or may be an element external to the SDN 409 and the verifier 401. The SDN 409 is depicted as including a SDN switch 410 that in turn includes a processing resource 411 and a machine-readable storage medium 412.

The processing resource 411 of the SDN switch 410 executes instructions 413 to cause 406 the SDN switch, to mark a packet passing through the SDN switch 410 with a packet tag. The processing resource 401 sends a tagging request to a tagging engine in the SDN switch 410 to create the packet tag that comprises an identifier of the SDN switch 410, a packet's ingress port on the SDN switch 410 and a digest of a set of network configuration of the SDN switch 410. Although FIG. 4 shows one SDN switch, the SDN may comprise a plurality of SDN switches wherein at least a subset of the plurality of SDN switches mark the packets passing through them with packet tags.

The processing resource 402 of the verifier 401 executes instructions 404-407 to cause 404 the verifier to generate a verifier tag based on the network rules table and a network topology table stored in the verifier 405. The processing resource 402 further executes instructions 405 to cause the verifier to issue a request for attestation of the packet to the SDN switch 410. The verifier 401 sends 414 an attestation request to the SDN switch 410 such that the SDN switch 410 forwards 415 the requested packet tag to the verification engine 408. The processing resource 402 also executes instructions 406 to cause the verification engine 408 to check the identifier of the SDN switch 410 in the packet tag against the identifier of the SDN switch 410 in the verifier tag, and instructions 407 to cause the verification engine 408 to check the network forwarding rules in the digest of the packet tag against the network forwarding rules in the digest of the verifier tag.

As used herein, a "verifier" may be a desktop computer, laptop (or notebook) computer, workstation, tablet computer, mobile phone, smart device, switch, router, server, blade enclosure, or any other processing device or equipment including a processing resource. In examples described herein, a processing resource may include, for example, one processor or multiple processors included in a single computing device or distributed across multiple computing devices.

As used herein, a "SDN switch" may be a switch, router, server, blade enclosure, or any other processing device or equipment including a processing resource. In examples described herein, a processing resource may include, for example, one processor or multiple processors included in a single computing device or distributed across multiple computing devices.

As used herein, a "processing resource" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 402 may fetch, decode, and execute instructions stored on machine-readable storage medium 403 to perform the functionalities described above in relation to instructions 404-407. Processing resource 411 may fetch, decode, and execute instructions stored on machine-readable storage medium 412 to perform the functionalities described above in relation to instructions 413. In other examples, the functionalities of any of the instructions of machine-readable storage mediums 403 and 412 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, respective instructions 404-407 and 413, may be part of an installation package that, when installed, may be executed by respective processing resources 402 and 411 to implement the functionalities described above. In such examples, machine-readable storage mediums 403 and 412 may be a portable medium, such as a CD, DVD, or flash drive, or a memory maintained by a server from which the installation package can be downloaded and installed. In other examples, instructions 404-407 and 412 may be respectively part of an application, applications, or component(s) already installed on devices 401 and 409 including respective processing resources 402 and 411. In such examples, the memory-readable storage mediums 403 and 412 may include memory such as a hard drive, solid state drive, or the like. In some examples, functionalities described herein in relation to FIG. 4 may be provided in combination with functionalities described herein in relation to any of FIGS. 1-3.

Marking and verifying packet tags as described herein may be useful for improving security by adding a digest of a set of the network forwarding rules that apply to the packet to the packet's tag. It permits to trustfully verify that the packet has been correctly forwarded and to attest that the rules on switch have not been tampered with. The solution also provides more flexibility in terms of security verification since it works at the packet level, aggregating in the packet the measurement from multiple switches, so verification is made on a per-flow basis. Besides, verification of certain network element characteristics is made directly from the network elements, so as not to rely on the SDN controller.

All of the features disclosed in this specification (including any accompanying claims, abstract and drawings), and/or all of the elements of any method or process so disclosed, may be combined in any combination, except combinations where at least some of such features and/or elements are mutually exclusive.

We claim:

1. A method comprising:
   marking, in at least one Software Defined Network (SDN) switch of an SDN, a packet passing through the SDN switch with a packet tag that comprises an identifier of the SDN switch and a digest of a set of network forwarding rules of the SDN switch;
   generating, by a verifier, a verifier tag that comprises the identifier of the at least one SDN switch and the digest of the set of network forwarding rules of the at least one SDN switch obtained from a network rules table and a network topology table stored in the verifier;
   receiving, at a particular network element and from the verifier, a request for attestation of the packet; and
   checking, by a verification engine, the packet tag against the verifier tag.

2. The method of claim 1, wherein the packet tag and the verifier tag further comprises a packet's ingress port on the SDN switch.

3. The method of claim 1, wherein the digest is of a set of network forwarding rules applied to the packet in the SDN switch or of an entire set of network forwarding rules of the SDN switch.

4. The method of claim 1, wherein when the packet passes through at least two SDN switches: the packet tag cumulatively comprises packet tags of previous SDN switches through which the packet has passed and the packet tag of a current SDN switch and the verifier tag cumulatively comprises verifier tags of previous SDN switches through which the packet passes and the verifier tag of the current SDN switch.

5. The method of claim 1, wherein checking the packet tag against the verification tag comprises:
   checking the identifier of the SDN switch of the packet tag against the identifier of the SDN switch of the verifier tag; and
   checking the network forwarding rules used in the digest of the packet tag against the network forwarding rules used in the digest of the verifier tag.

6. The method of claim 1, receiving, by the verifier and from an SDN controller, a current network configuration of the SDN.

7. The method of claim 6, wherein the current network configuration comprises a current network topology and a current rule mapping of each of the SDN switches.

8. The method of claim 7, comprising updating, by the verifier, the network rules table and the network topology table based on the received current network configuration.

9. The method of claim 1, comprising sending, by the verifier, the verifier tag to the verification engine after receiving the request for attestation for the packet.

10. The method of claim 1, comprising signing the tag by a security hardware component located in the SDN switch.

11. A system comprising:
- at least one Software Defined Network (SDN) switch of an SDN to mark a packet passing through the at least one SDN switch with a tag that comprises an identifier of the at least one SDN switch, a packet's ingress port on the at least one SDN switch and a digest of a set of network configuration rules of the at least one SDN switch;
- a verifier to: generate a verifier tag that comprises the identifier of the at least one SDN switch and the digest of the set of network forwarding rules of the at least one SDN switch obtained from a network rules table and a network topology table stored in the verifier, and issue a request for attestation of the packet to a network element; and
- a verification engine to: check the identifier of the at least one SDN switch of the packet tag against the identifier of the at least one SDN switch of the verifier tag, and check the network forwarding rules used in the digest of the packet tag against the network forwarding rules used in the digest of the verifier tag.

12. The system of claim 11, wherein the system further includes a current SDN switch and wherein when the particular packet passes through at least two SDN switches:
- the current SDN switch to cumulatively mark the particular packet with packet tags of previous SDN switches through which the packet has passed and the packet tag of the current SDN switch; and
- the verifier to cumulatively generate the verifier tag with verifier tags of previous SDN switches through which the packet passes and the verifier tag of the current SDN switch.

13. The system of claim 12, wherein the verifier is further to check the cumulative digest and the identifiers of the at least two SDN switches against the network rules table and a network topology table stored in the verifier.

14. The system of claim 11, wherein the verifier is further to receive from an SDN controller a current network configuration of the SDN.

15. The system of claim 14, wherein the verifier is further to receive a current network topology and a current rule mapping of each of the SDN switches as part of the current network configuration.

16. The system of claim 15, wherein the verifier is further to update the network rules table and a network topology table stored in the verifier based on the received current network configuration.

17. The system of claim 11, wherein the at least one SDN switch is further to mark the packet tag with a digest of a set of network forwarding rules applied to the packet in the at least one SDN switch or with a digest of the entire set of network configuration rules of the at least one SDN switch.

18. A system comprising:
- a plurality of Software Defined Network (SDN) switches in an SDN, wherein at least one SDN switch comprises a tagging engine to mark packets passing through the SDN switch with a packet tag that comprises an identifier of the SDN switch and a digest of a set of network configuration rules of the SDN switch;
- a verifier to store, for the at least one SDN switch, a network topology table comprising paths between the SDN switch and the rest of SDN switches and a network rules table comprising a set of network forwarding rules of the SDN switch, wherein the verifier is to:
  - generate a verifier tag comprising an identifier of the SDN switch and a digest of the set of network forwarding rules of the SDN switch obtained from the network rules table and a network topology table; and
  - send, to a particular network element, a request for attestation of the packet; and
- a verification engine to check the packet tag against the verifier tag.

19. The system of claim 18, comprising an SDN controller to send to the verifier a current network configuration of the SDN that comprises a current network topology and a current rule mapping of each of the SDN switches.

20. The system of claim 18, wherein each SDN switch comprises:
- an SDN rule table storing the network forwarding rules of the SDN switch; and
- a rule applicator engine to apply respective network forwarding rules to a particular packet passing through the SDN switch based on the SDN rule table.

* * * * *